(12) United States Patent
Gupta et al.

(10) Patent No.: US 11,184,352 B2
(45) Date of Patent: Nov. 23, 2021

(54) SYSTEMS AND METHODS FOR ACTIVATING AN AUTHENTICATION TOKEN WITHIN A COMMUNICATION PLATFORM

(71) Applicant: The Western Union Company, Denver, CO (US)

(72) Inventors: Abhinav Gupta, Foster City, CA (US); Shankar Narayan, Pleasanton, CA (US)

(73) Assignee: The Western Union Company, Denver, CO (US)

( * ) Notice: Subject to any disclaimer, the term of this patent is extended or adjusted under 35 U.S.C. 154(b) by 259 days.

(21) Appl. No.: 16/412,065

(22) Filed: May 14, 2019

(65) Prior Publication Data

US 2020/0366669 A1   Nov. 19, 2020

(51) Int. Cl.
| | |
|---|---|
| *H04L 29/06* | (2006.01) |
| *G06F 16/903* | (2019.01) |
| *G06K 19/06* | (2006.01) |

(52) U.S. Cl.
CPC .... *H04L 63/0838* (2013.01); *G06F 16/90335* (2019.01); *G06K 19/06028* (2013.01); *G06K 19/06037* (2013.01)

(58) Field of Classification Search
CPC .......... H04L 63/0838; G06F 16/90335; G06K 19/06028; G06K 19/06037
USPC ............................................................ 726/7
See application file for complete search history.

(56) References Cited

U.S. PATENT DOCUMENTS

| | | | |
|---|---|---|---|
| 2009/0198617 A1* | 8/2009 | Soghoian | G07F 9/001 705/65 |
| 2015/0215310 A1* | 7/2015 | Gill | H04L 63/0838 726/7 |
| 2019/0013945 A1* | 1/2019 | Hamlin | H04W 12/06 |
| 2019/0197522 A1* | 6/2019 | Jangid | G06Q 20/204 |

* cited by examiner

*Primary Examiner* — Jacob Lipman
(74) *Attorney, Agent, or Firm* — Kilpatrick Townsend & Stockton, LLP

(57) ABSTRACT

The embodiments described herein relate generally to securely establishing an account and authentication metrics associated with a communication platform. An account associated with a communication platform may allow a user associated with the account to send and receive communications via the communication platform.

20 Claims, 9 Drawing Sheets

| Access Code | First Name | Last Name | Address | Authentication Token | Communication History |
|---|---|---|---|---|---|
| abc123 | John | Doe | 222 W. Johnson Street | Seed: xyz987 Algorithm: RN1 | $200 Transfer to Jane Doe |
| | | | | | Private Message to Jack Doe |
| a56544 | Jack | Johnson | 555 Berkeley Street | Seed:aaazz5 Algorithm: RN2 | Post to profile page |
| | | | | | $50 Transfer to John Roberts |
| 66654b | Marry | Washington | 967 West Blvd. | Seed: 001007 Algorithm: RN1 + key1 | $100 Transfer to Rebecca Thomas |
| | | | | | $5000 Transfer to Shelton Thomas |

| Access Code | First Name | Last Name | Address | Authentication Token | Communication History |
|---|---|---|---|---|---|
| abc123 | John | Doe | 222 W. Johnson Street | Seed: xyz987 Algorithm: RN1 | $200 Transfer to Jane Doe |
| | | | | | Private Message to Jack Doe |
| a56544 | Jack | Johnson | 555 Berkeley Street | Seed:aaazz5 Algorithm: RN2 | Post to profile page |
| | | | | | $50 Transfer to John Roberts |
| 66654b | Marry | Washington | 967 West Blvd. | Seed: 001007 Algorithm: RN1 + key1 | $100 Transfer to Rebecca Thomas |
| | | | | | $5000 Transfer to Shelton Thomas |

FIG. 2

Profile Page

First Name: Jack

Middle Name (optional):

Last Name: Johnson

Address: 555 Berkeley Street

Phone: 910 350 7756

D.O.B. (optional):

Success

Your authentication token has been activated

SYSTEMS AND METHODS FOR ACTIVATING AN AUTHENTICATION TOKEN WITHIN A COMMUNICATION PLATFORM

BACKGROUND OF THE INVENTION

As more and more communications happen via a wireless connection such as the Internet, it may be increasingly important to ensure that those communications happen in a secure and efficient manner. Furthermore, when initiating a communication via a wireless connection a user may have an associated account for an associated communication platform. For example, if a user were to send a communication via a social media platform, the user may need to have an account associated with that social media platform. In a traditional process, a user may submit personal information such as name and e-mail address to a server system associated with the social media platform so that an account may be created for that user. A user may further set up their own authentication metrics (e.g., password and user name) in order to access their account. However, this process of establishing an account and authentication metrics is not efficient or secure. Therefore, there is a need for a system to efficiently and securely establish an authentication token and an account for a communications platform.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components. If only the first reference label is used in the specification, the description can be applicable to any one of the similar components having the same first reference label irrespective of the second reference label.

FIG. 2 illustrates an exemplary database entry in accordance with one or more embodiments.

FIG. 7 illustrates an exemplary prepopulated webpage in accordance with one or more embodiments.

FIG. 8 illustrates a first exemplary interface in accordance with one or more embodiments.

BRIEF SUMMARY OF THE INVENTION

Figure 1:
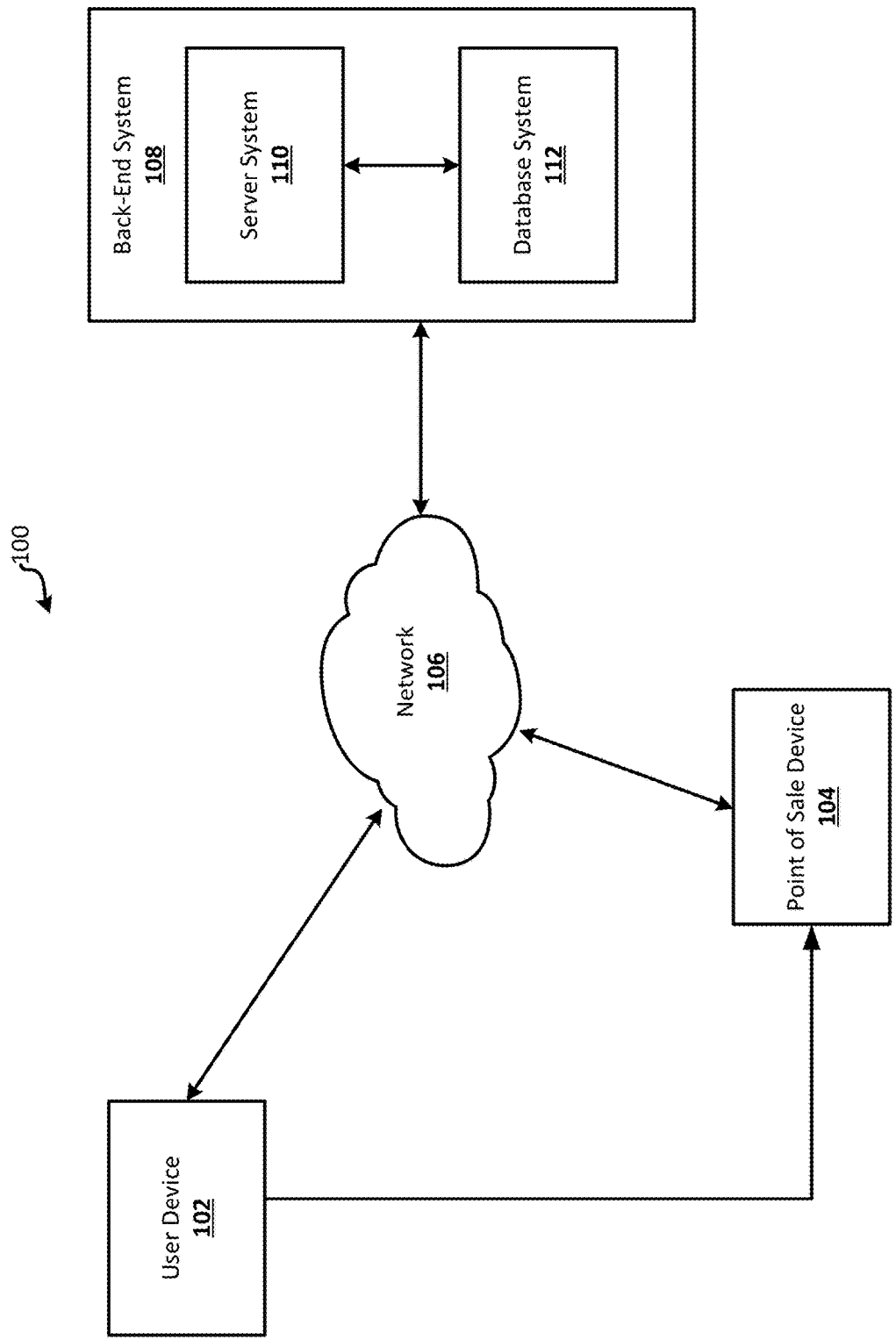
FIG. 1 illustrates an exemplary computer network according with one or more embodiments.

The embodiments described herein relate generally to establishing an account and authentication metrics associated with a communication platform. In one embodiment, a computer-implemented method for authorizing a communication within a communication platform is described. The computer-implemented method may include receiving, from a first device, a first communication. The computer-implemented method may further include parsing the first communication to extract a first data set. The computer-implemented method may further include storing, the first data set as account information associated with a second device. The computer-implemented method may further include generating, based at least on a part of the account information, an account code. The computer-implemented method may further include generating, based at least on a part of the account information, the authentication token. The computer-implemented method may further include transmitting, to the first device, the account code. In one embodiment, the first device is configured to render the account code. The computer-implemented method may further include receiving, from the second device, the account code. The computer-implemented method may further include in response to receiving the account code, activating the authentication token to generate a first one-time password. The computer-implemented method may further include receiving, from the second device, a second communication and a second one-time passcode. The computer-implemented method may further include comparing the first one-time passcode and the second one-time passcode to authorize the second communication. The computer-implemented method may further include in response to authorizing the second communication, executing the second communication.

In one embodiment, the first communication may be associated with an asset transaction. In one embodiment the first device is located at a physical location and the physical location is associated with the communication platform. In one embodiment, the authentication token may comprise a seed value and an algorithm identifier. In one embodiment, the authentication token may comprise a hash of one or more parts of the account information. In one embodiment, the account code is a Quick Response (QR) code or a barcode. In one embodiment, the second communication comprises a text message to user of the communication platform.

DETAILED DESCRIPTION OF THE INVENTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

The embodiments described herein relate generally to establishing an account and authentication metrics associated with a communication platform. An account associated with a communication platform may allow a user associated with the account to send and receive communications via the communication platform. In order to securely establish an account, a user may initiate a communication. The communication may be initiated via a device situated at a physical location associated with the communication platform. For example, the physical location may be a retail location associated with the communication platform. The communication may include various pieces of personal information associated with the sender and receiver of the communication. Such personal information may include a sender's name, a sender's address, a sender's telephone number, a receiver's name, a receiver's address, a receiver's telephone number, and the like.

A back-end system associated with the communication platform may receive the communication and associate an account code and authentication token with the communication. The back-end system may generate within a database or database schema account information associated with the user based on the information within the communication. For example, the back-end system may generate an account identifier/account code and associate that account identifier with account information such as: sender's name, sender's address, and/or the sender's phone number. In such an embodiment, the back-end system may generate the account code based on the account identifier. In embodiment, the account code may be embodied as a QR code representation of the account identifier. The back-end system may also generate an authentication token. The authentication token may be based on one or more parts of the account information. For example, the back-end system may generate a hash of a sender's first name concatenated with a hash of a sender's last name to generate a first hash. The first hash may be utilized as a seed in a random number generator that may periodically generate a temporary password. The back-up system may also store an identification of the random number generator within the account information. The back-up system may send the identification of the random number generator to a mobile device associated with the communication, such that the mobile device may recreate a temporary password that matches the temporary password produced by the back-end system.

Once the back-end system has generated account information (including an account code and authentication token), the back-end system may transmit the account code to a receiving device. The receiving device may be a mobile device associated with a user (e.g., a mobile phone) or a device situated at a physical location associated with the communication platform (e.g. a point of sale device). The receiving device may render the account code. In one embodiment, the receiving device may render the account code in the form of a QR code. In such an embodiment, the receiving device may render the account code on a piece of a paper (e.g., a receipt). In one embodiment, the receiving device may render the account code in response to processing a request for a transfer of electronic funds. The request for transfer of electronic funds may be included within the communication. As a result, the information provided in the communication may be more likely to be factual because it is associated with an asset transfer (e.g. financial transfer). In some instances, a user may provide fictitious information (e.g., a fake name or phone number) if the communication is for something other than an asset transaction (e.g., to simply message to another user of the communication platform), because there may be little incentive for the user to provided factual information. On the other hand, a user may be encouraged to provide factual information in an asset transaction because there may be a direct monetary value correlated to the communication.

A user device may be utilized to scan the rendered account code. For example, a user device such as a mobile device may use a camera to read the account code embodied as a QR code on a paper receipt. In another example, a user device may utilize a camera to read the account code embodied as a QR code that is displayed on a device situated at a physical location associated with the communication platform. In one embodiment, the account code may be sent to the user device in a text message (or multimedia message) via information provided in the communication (e.g., the sender's phone number or e-mail address). In any instance, once the user device acquires the account identifier from the account code the user device may transmit the account identifier to the back-end system.

In response to receiving the account identifier from the user device, the back-end system may query associated memory to determine account information associated with the account identifier. The back-up system may utilize the account information to prepopulate a webpage associated with the communication platform. In one embodiment, the back-up system may retrieve a webpage associated with a first Uniform Resource Locator (URL) address from an associated web server. The back-up system may then fill in particular fields in the webpage based on the account information. For example, the webpage may be a page associated with creating an account associated with the communication platform. In such an example, the back-end system may complete data fields within the webpage requesting personal information associated with the user, such as, but not limited to, a user's name, a user's phone number, a user's date of birth, and/or a user's email address. The prepopulated webpage may then be transmitted to the user device via a URL or some other means.

The user device, after receiving the prepopulated webpage, may render for display, via a graphical user interface, the prepopulated webpage. In one embodiment, a user associated with the user device may confirm or reject one or more prepopulated data fields within the prepopulated webpage. For example, a user name field may be prepopulated with the name "John Doe", but it may be modified to "John Johnson". In another example, an icon may be displayed next to each data field such that the icon may be selected if the data in the prepopulated data field is acceptable. Thus, the prepopulated webpage may be modified if any data within a prepopulated data field is incorrect. Also the data within the prepopulated data field may be confirmed if the data is accurate.

Once approved or modified, an indication of the data fields within the prepopulated webpage may be received by the back-end system. In response, the back-end system may activate the authentication token within the user's account information. To activate the authentication token, the back-end system may initiate the generation of one-time passwords based on seed values. For example, a seed value may be derived by taking the hash of one or two or more parts of a user's account information, such as a user's first name and a user's last name. This temporary random number may be regenerated every set period of time (e.g. every 60 seconds, every 2 minutes, every 1 day, and the like). Furthermore, during the activation of the authentication token, the back-end system may push to the user device an indication of the values utilized to generate the seed and an indication of the particular random number algorithm utilized. For example, the back-end system may send a message to the user device comprising "Seed value=Hash algorithm 1 (first name)+ Hash algorithm 2 (last name). Random number algorithm 3." This may indicate to the user device to take a hash using a first algorithm (e.g., SHA 256) of the user's first name and concatenate that value with a hash using a second algorithm (Message Digest 5) of the user's last name to generate the seed value. The user device may then use the generated seed and input that seed into the identified random number algorithm to generate the same random number that the back-end system produces. In one embodiment, a list of algorithms may be sent separately such that which algorithm corresponds to hash algorithm 1 may be identified in a separate communication from the back-end system.

The user device may then generate a one-time password (e.g., passcode) and send it to the back-end system whenever the user wishes to utilize the communication platform. For example, if a user wants to send a second communication via the communication platform, the user may first log into his account by submitting the one-time password to the back-end system. The back-end system may then confirm which user the one-time password corresponds to and authenticate the user. Once authenticated the user may send the second communication via the communication platform.

As described, the systems, methods, and apparatuses described herein detail a secure and efficient way to establish an authentication token and an account for a communications platform. The described embodiments offer an improvement over prior systems in part because a user of a user device may only need to scan a QR code in order to establish an account with the communications systems. Prior systems may require a user to manually enter in personal information in order to establish an account. Furthermore, security associated with the user account may be increased over prior systems by the generation of the authentication token based at least in part on a combination of account information which may be known by the user of the user device and the back-end system (e.g., user address, date of birth, and the like).

FIG. 1 illustrates an exemplary computer network 100 according to one or more embodiments described herein. Computer network 100 comprises a user device 102, a communication platform device 104, network 106, and back-end system 108. In one embodiment, communication platform device 104 and back-end system 108 may be associated with or operated by a single communication platform. A communication platform may be an entity that provides structure for transmitting and executing communication requests. A communication may include a request to transfer electronic funds from one account to another or from one location to another. A communication may include information associated with the sender and the receiver of the communication as well as device information associated with the sender of the communication, such as the sending device's location, make/model, phone number, International Mobile Equipment Identity (IMEI), and the like. A communication may include text, images, pictures, between users associated with the communication platform. In one embodiment, the communication platform may be a services provider such as Western Union. In one embodiment, the communication platform may be a social media services provider.

User device 102 may comprise one or more processors and non-volatile memory. The processor(s) may include single or multicore processors. The processors may operate under the control of software stored in the associated non-volatile memory. Processor(s) within user device 102 may execute one or more applications to transmit and receive communications (i.e. electronic communications) in computer network 100. In some embodiments, one or more applications executed by user device 102 may generate a one-time password based on information received from back-end system 108 and/or information stored within associated non-volatile memory present on or associated with user device 102.

User device 102 may include various types of computing systems, such as portable handheld devices, personal computers, laptops, tablets, cellular phones, smart phones, workstation computers, wearable devices, thin clients, and the like. These computing devices may run various types and versions of software applications and operating systems such as Linux or Linux-based operating systems. Although one user device 102 is depicted, it is within the scope of the disclosures described herein to have multiple user devices within computer network 100.

Communication platform device 104 may comprise one or more processors and non-volatile memories. The processor(s) may include single or multicore processors. The processors may operate under the control of software stored in the associated non-volatile memory. Processor(s) within communication platform device 104 may execute one or more applications to transmit and receive communications (i.e. electronic communications) in computer network 100. In one embodiment, communication platform device 104 may reside at a physical location associated with a communication platform. In such an embodiment, one or more applications executed by communication platform device may facilitate a local communication, such as a communication that is initiated in-person rather than through a wireless connection. Communication platform device 104 may receive information associated with a communication such as a sender's name and a receiver's name as well as other details about the communication. Communication platform device 104 may relay the communication to back-end system 108 for further processing. One or more applications executed by communication platform device 104 may enable communication platform device 104 to receive an account identifier or account code from back-end system 108 and render the account identifier or account code in a suitable format. Such a format may be a QR code, a bar code, or another computer-readable format. In one embodiment, communication platform device 104 may include a printing device to physically print the account identifier or account code in a computer-readable format along with other details of an associated communication.

Communication platform device 104 may include various types of computing systems, such as portable handheld devices, personal computers, laptops, tablets, cellular phones, smart phones, workstation computers, wearable devices, thin clients, and the like. These computing devices may run various types and versions of software applications and operating systems such as Linux or Linux-based operating systems. Although one communication platform device 104 is depicted, it is within the scope of the disclosures described herein to have multiple communication platform devices within computer network 104.

Network 106 may facilitate communications between the various systems depicted in FIG. 1. Network 106 may be of various types and can include the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, Bluetooth®, and other protocols.

Back-end system 108 may be a computing system that operates one or more parts of a communication platform within computer system 100. Back-end system 108 may process and execute a plurality of received communications. Back-end system 108 may comprise of server system 110 and database system 112. Server system 110 may be a computerized system for receiving communications and processing communications associated with a communication platform. For example, server system 110 may receive a communication comprising a first set of information and facilitate storage of that information within database system 112 as account information associated with a user identified by the communication. Server system 110 may also generate an account identifier based on a received communication and encode the account identifier such that it may be rendered in a particular format by user device 102 and/or communication platform device 104. For example, server system 110 may generate an account identifier and encode the account identifier such that it may be rendered as a QR code. Server system 110 may also generate an authentication token associated with a received communication. The authentication token may be a combination of a seed value and an algorithm that together produce a one-time password that may be used to authenticate a user associated with an account. Server system 110 may prepopulate a webpage with account information and push the prepopulated webpage to a user device (e.g. user device 102). The prepopulated webpage may be a webpage requesting confirmation of account information. In response to receiving a reply to the prepopulated webpage, server system 110 may activate the authentication token such that a user associated with a user account may be authenticated. Once authenticated, communications from a user may be received by server system 110 and processed by server system 110 to cause one or more results. For example, a result may be delivering a communication to another user associated with the communication platform, processing an electronic transfer of funds, activating an authentication token, and the like.

Server system 110 may comprise one or more servers. In one embodiment, server system 110 may comprise one or more applications servers and one or more web servers. Each server within server system 110 may comprise one or more processors and non-volatile memory. The processor(s) may include single or multicore processors. The processors may operate under the control of software stored in the associated non-volatile memory. Processor(s) within each point of each server within server system 110 may execute one or more applications to perform one or more operations of server system 110 within computer network 100.

Database system 112 may store account information associated with users within computer network 100. Account information may be transmitted to database system 112 by server system 110 based on a received communication. Account information may include: a user's first name, a user's last name, an alphanumeric password, a user's address, a user's username, a user's date of birth, transaction information associated with a user, past transaction information associated with the user, past communications associated with the user, an account identifier, an encoded account identifier, an authentication token (e.g., a seed value and a random number generator algorithm), communication restrictions (e.g., time of day restrictions, recipient restrictions, and other information associated with a user of a communication platform). Server system 110 may query database system 112 to retrieve account information when authenticating a user or authorizing a communication by a user. For example, server system 110 may receive a communication from user device 102. In response, server system 110 may request, from user device 102, a one-time password. Server system 110 may query, database system 112 for the authentication token associated with the user of user device 102 in order to generate a second one-time password. Server system 110 may then compare the received one-time password to the generated second one-time password to determine if the communication should be executed (i.e. authorize the communication). In another example, server system 110 may receive a communication comprising an account identifier from user device 102. In response, server system 110 may query database system 112 with the account identifier to locate account information associated with the user and to subsequently activate an authentication token associated with the user.

FIG. 2 illustrates an exemplary database entry 200 within a back-end system. Database entry 200 may contain one or more pieces of account information associated with a user of a communication platform. Database entry 200 may comprise an access code column, a first name column, last name column, an address column, an authentication token column, and/or a communication history column. Each row may correspond to a particular user of the communication platform and each column may correspond to a different part of account information associated with a user. Database entry 200 may be stored within a database or other memory associated with a back-end system of a communication platform.

Access code column may store an account identifier associated with an account on the communication platform. An access code may be a numeric, text, alphanumeric, or other unique identifier. In one embodiment, access codes may be read from database entry 200 by a back-end system and encoded via the back-end system into a computer-readable format such as a QR code.

First name column may store a first name identifier associated with an account on the communication platform. A first name may be a legal first name of a user, a pen name, a handle, and the like. Likewise, last name column may store a last name identifier associated with an account on the communication platform. A last name may be a legal last name of a user, a pen name, a handle, and the like. In one embodiment, only a first or last name may reside within database entry 200. In such an embodiment, a user may be identified by a single name such as an email address, username, and the like.

Address column may store a physical or virtual address associated with an account on the communication platform. An address may be a physical address associated with a user such as a business address, a home address, an physical address where a user receives physical mail, and the like. An address may also be a virtual address associated with a user such as an email address, an address or handle that indicates where a user receives virtual messages or mail, and the like.

Authentication token column may store a seed value and an indicator of an algorithm for generating a one-time password. A seed value may be a value that is utilized by an identified algorithm to produce a one-time password. A one-time password may be any password whose validity is temporary. A seed value may be indicated in the authentication token column. The seed value may be calculated based on one or more parts of a user's account information. For example, the seed value may be a hashed value of a user's first name, a user's last name, address, one or more prior transactions, or any combination thereof. In another embodiment, the seed may be a randomly generated value that is unique for each user. In one embodiment, instead of storing the actual seed value an identification of a part of a user's account information may be identified. For example, instead of having seed: xyz987, which indicates the seed value of "xyz987", an entry may exist of seed: First Name+ Previous Address. This entry may indicate that a seed value is calculated based on the first name and a previous address of a user (which may be different from the address depicted in database entry 200). In such an embodiment, a back-end system may retrieve the seed information and dynamically calculate the seed value. For example, the back-end system may determine the users first name and previous address and preform a hash on each value to generate the seed value. In another example, the back-end system may simply use the first name concatenated with a previous address as the seed value. By not storing the actual seed value the security of the database may be improved such that if a database is compromised the actual seed value may not be exposed. To further increase security, database entry 200 may be stored in a first location or database and the authentication token column may be stored in a separate database entry at a second location that is remote to database entry 200. In such an instance, a malicious user may have to access two different datasets stored in two different locations in order to calculate a seed value.

Authentication token column also stores an identifier of an algorithm that may utilize the seed value in order to calculate a one-time password. As can be seen in database entry 200, each user account may use a different algorithm and seed value to create a one-time password. In such an instance, the security of the back-end system may be increased because if a malicious user gains access to a seed value and an algorithm of a first user, the malicious user's breach may be contained to that user. Various algorithms may be utilized to generate a one-time password. For example, RN1 may refer to a Random Cycle Bit Generator (RCB), RN2 may refer to an Advance Randomization System (ARS). Other random number generators may be utilized such as, Threefry, Philox, SplitMix, Premuted Congruential Generator (PCG), Xoroshiro128+, Salsa20, Indirect, Shift, Accumulate, Add, and Count (ISAAC), Rivest Cipher 4 (RC4), Advanced Encryption Standard (AES), Naor-Reingold pseudorandom function, and/or other cryptographic algorithms. In one embodiment, hardware may be utilized to compute a one-time password. In such an embodiment, an authentication token may indicate an encryption key that may be utilized to produce the one-time password. For example, "algorithm: RN1+key1" may indicate that a first algorithm (RCB) may be utilized to generate a number, then this number may encrypt a first key (e.g., a symmetric key shared between the back-up system and a first user) to produce the one-time password. Using an encryption key (e.g., public/private key or symmetric key), may increase the security a database because in order for a malicious user to create a one-time password they would need to possess a seed value, algorithm, and a key. In one embodiment, the key identified in the authentication token column may be stored in a database entry at a third location that is remote to database entry 200. As a result, in at least one embodiment, database entry 200 absent the authentication token column may be stored in a first location, the authentication token column may be stored in a second location, which may contain identifiers of a seed value, algorithm, and key, and the actual keys associated with the authentication token may be stored in a third location. Each of these storage locations may be remote from the other and encrypted by different keys for added security.

Communication history column may store data associated with past communications associated with a user. Every time a communication is received by a back-end system, data from that communication may be stored in database entry 200. In some instances, communication history may comprise the recipient of certain communications, a transaction amount associated with a communication and the like. For example, communication history column may have an entry of "post to profile page", which may indicate that a particular user has posted a particular message to their profile page for other users of the communication platform to see. In some embodiments, one or more prior communications may be utilized to generate a seed value for the authentication token. In such an instance, a user of a user device may enter into the user device details of a prior communication and a one-time password may be dynamically generated and sent to a back-end system. The back-end system may then query database entry 200 to determine a corresponding transaction and calculate an independent one-time password. If the back-end system and the user device use the same information to generate the one-time password both passwords will be the same and the user may be authenticated. In such an embodiment, security may be increased because the one-time password does not just rely on stored data, but may also require a user to remember details of a prior communication associated with a prior communication. For example, a seed value may be created based on the date a user posted the message "Loving Life" to his profile.

Figure 3:
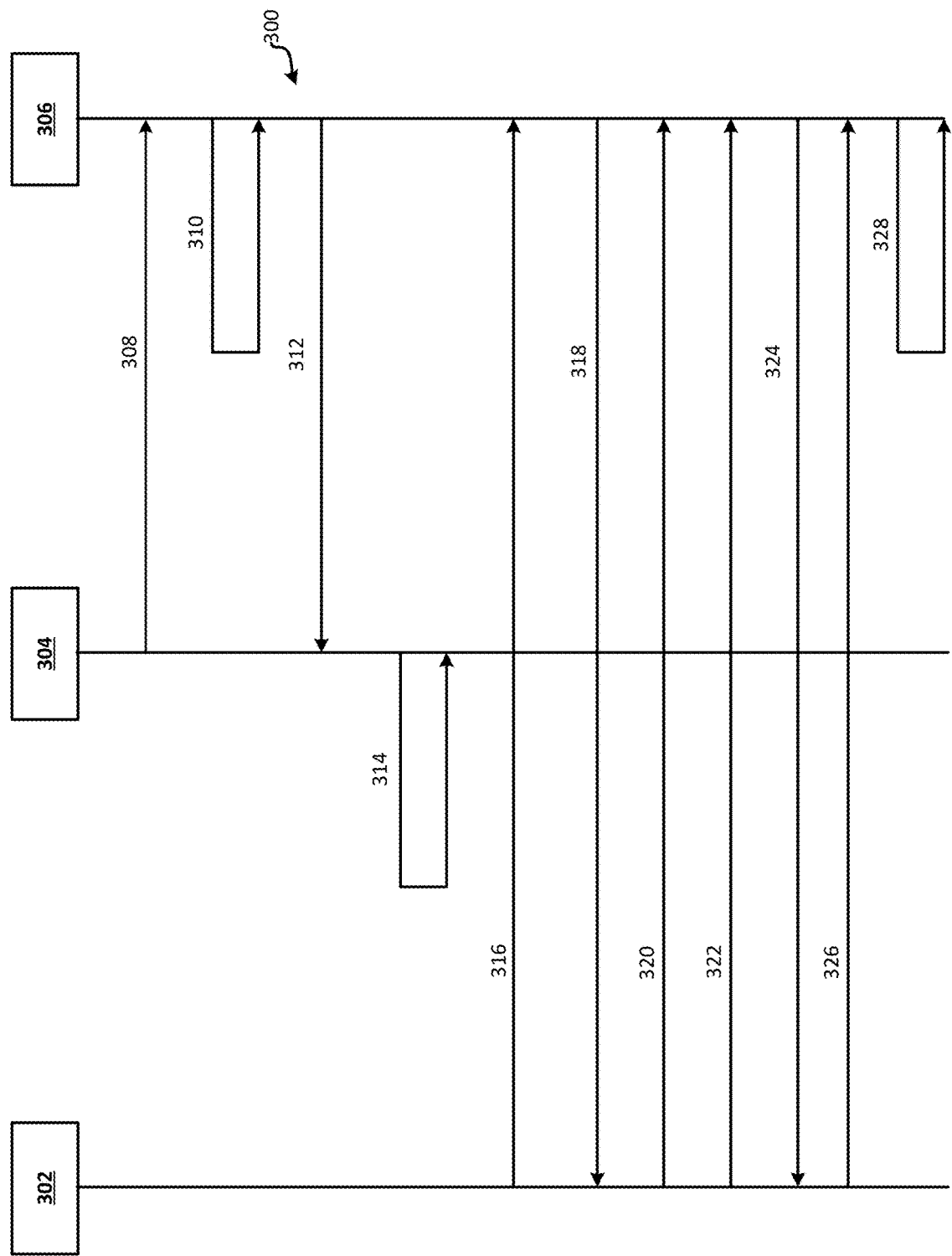
FIG. 3 illustrates an exemplary signal diagram in accordance with one or more embodiments.

FIG. 3 illustrates signal diagram 300 which depicts the interactions between user device 302, communication platform device 304, and back-end system 306 within a communication platform. At 308, a communication is transmitted from communication platform device 304 to back-end system 306. The communication may be for a request of a variety of actions associated with the communication platform, such as posting a text message to a public profile, messaging another user associated with the communication platform, sending electronic funds to another user associated with the communication platform, and the like. The communication may include various pieces of personal information associated with the sender and receiver of the communication. Such personal information may include a sender's name, a sender's address, a sender's telephone number, a receiver's name, a receiver's address, a receiver's telephone number, and the like. The sender of a communication may be the user of user device 302. In one embodiment, the user of user device 302 may enter a physical location associated with the communication platform and communication platform device 304 may receive the communication and transmit the communication to back-end system 306. In another embodiment, communication platform device 304 may read from user device 302 via a wireless connection (e.g. Bluetooth, radio frequency (RF), near field communication (NFC) and the like) a communication and transmit the communication to back-end system 306. For example, a user via user device 302 may construct a communication, user device 302 may then transfer data to communication platform device 304 via a wireless connection such as NFC and subsequently communication platform device 304 may send the communication to back-end system 306.

At 310, back-end system 306 generates an account code and an authentication token associated with the received communication. Upon receiving the communication, back-end system 306 may record various information from the communication into a database as account information. Back-end system 306 may generate a unique identifier, such as an alphanumeric identifier for the account information. This unique identifier may uniquely identify account information associated with a particular user. In one embodiment, the unique identifier may be the account code. In one embodiment, the account code may be generated based on the account identifier. For example, an account code may be embodied as a QR code representation of the unique identifier (i.e. account identifier).

Back-end system 306 may generate an authentication token based on one or more parts of the account information.

For example, the back-end system may generate a hash of a sender's first name concatenated with a hash of a sender's last name to generate a first hash. The first hash may be utilized as a seed in a random number generator that may periodically generate a temporary one-time password. The seed value and the identifier of an algorithm may together be referred to as the authentication token.

At 312, back-end system 306 transmits the account code to communication platform device 304. The account code may be transmitted in a raw form (e.g., numeric, alphanumeric, string, etc.) or in an encoded form (e.g., bar code, QR code, etc.). At 314, communication platform device 304 may render the received account code. Communication platform device 304 may render the account code a plurality of ways. In one embodiment, communication platform device 304 may render the account code in the form of a QR code. In such an embodiment, communication platform device 304 may render the account code on a printed piece of paper (e.g., a receipt). In one embodiment, communication platform device 304 may render the account code on an associated display in the form of a bar code. Once rendered, user device 302 may obtain the account code by various means including scanning a QR code from a printed piece of paper or a display, wireless transmission via NFC or other suitable wireless protocol, and/or manual input by a user associated with user device 302.

At 316, user device 302 having obtained the account code via communication platform device 304 transmits to back-end system 306 the account code. The transmission of the account code to back-end system 306 may indicate a request to activate an account associated with the communication platform and/or activate an authentication token associated with the communication platform. Back-end system 306 may query associated memory to determine if the received account code matches a stored account code or account identifier. If it does, back-end system 306 may obtain various account information associated with that account code. However, if the received account code does not match a stored account code or account identifier then an error is returned to user device 302.

At 318, back-end system 306 may utilize the retrieved account information to prepopulate a webpage with account information associated with a user of user device 302. The account information may be gathered based on one or more past received communications associated with the user of user device 302. For example, a webpage may indicate data fields for personal information associated with a user such as name, address, date of birth, and the like. Such information may be stored in memory associated with back-end system 306 as account information. Thus, back-end system 306, without additional commands from user device 302, may automatically prepopulate a webpage with corresponding data. For example, back-end system 306 may automatically populate a data field entitled "name" with a user's first name as indicated in account information associated with the user. This prevents the user of user device 302 from having to manually enter in information into user device 302. Furthermore, it prevents user device 302 from having to input information through other means (e.g., previously stored inputs, cookies, etc.) This may increase the security of user device 302 by not having personal information stored within user device 302. Instead such personal information may be stored by back-end system 306. In addition, it may improve the performance of user device 302 as computational resources, such as memory, on user device 302 would not be utilized for inputting personal information into a webpage. Once back-end system 306 has prepopulated data fields within the webpage, the prepopulated webpage is pushed to user device 302. In one embodiment, back-end system 306 may not have enough account information to prepopulated all of the data fields within the webpage. In such an instance, one or more data fields within the webpage may be left blank.

At 320, user device 302 may confirm or modify data fields within the prepopulated webpage. The prepopulated webpage may have an icon or widget next to each data field which may allow a user of user device 302 to confirm a corresponding data field entry. A data entry may be modified if the prepopulated data field is incorrect or if the prepopulated data field is no longer valid. For example, a prepopulated field for an address may have at one point been accurate for a particular user, but the user may have since moved making the prepopulated address field no longer valid. In such an example, user device 302 may receive a modification for the prepopulated field. In instances where there is no modification necessary, user device 302 may receive an input associated with a confirmation of a prepopulated data field. For example, user device 302 may receive an input that indicates a user has selected a confirm icon or widget associated with a prepopulated data field. User device 302 may transmit confirmations or modifications within the prepopulated webpage to back-end system 306.

In response to receiving the conformations and/or modification within the prepopulated webpage, back-end system 306 may activate an authentication token associated with the user. An authentication token may be stored in account information associated with a particular user. The authentication token may be dormant (i.e. not utilized to produce a one-time password) prior to back-end system 306 receiving the confirmations and/or modifications with the prepopulated webpage. In a sense, the reception of the conformations and/or modifications within the prepopulated webpage may act as a confirmation to initialize an account associated with the user. Upon activation of the account, back-end system 306 may activate the authentication token by commencing the generation of one-time passwords associated with the user. The one-time passwords may be utilized by back-end system 306 to not only authenticate a user associated with an account, but also to authorize communications associated with a user's account. For example, a user's account may have certain restrictions, such as a time when communications may be sent, a maximum and minimum asset value associated with a communication, a whitelist of recipients for communications, and the like. For example, a restriction may prevent communications from being sent to particular users associated with the communication platform (e.g., users over the age of 18). However, prior to the authentication token being activated, back-end system 306 may not invoke such restrictions. As a result, a user may be able to by-pass restrictions associated with a user account by not having an associated account or authentication token activated. Thus, once a user's account has been activated in response to receiving the confirmations and/or modifications within the prepopulated webpage, a user's account may be more securely regulated by back back-end system 306 via the one-time password and/or restrictions.

At 322, a new communication may be received by back-end system 306. In one embodiment, the new communication may be transmitted by user device 302. In one embodiment, the new communication may be transmitted by communication platform device 304. The new communication may be any communication associated with the communication platform provided by back-end system 306. The new communication may be associated with a user account of a user of user device 302. Upon receipt of the new communication, back-end system 306 may query associated memory to determine account information associated with the new communication. In one embodiment, the new communication may include a phone number associated with user device 302 and back-end system 306 may query associated memory with the phone number to locate account information associated with a user/user device 302. Once back-end system 306 locates account information associated with the new communication, back-end system 306 may send a request to user device 302 to transmit a one-time password. As a result, in one embodiment, the new communication may transmitted by a first device (i.e. communication platform device 304) to back-end system 306 and in response, back-end system 306 may request a one-time password from a second device (i.e. user device 302) for authentication and/or authorization of one or more aspects associated with the new communication (e.g., authenticating a user and authorizing the new communication).

At 322, user device 302 may transmit a one-time password to back-end system 306. User device 302 may generate a one-time password based on at least a seed value and an algorithm. Back-end system 306 may compare the received one-time password to a generated one-time password. If the passwords match then at 324, back-end system 306 may execute the new communication. For example, an executed new communication may result in a message being transmitted to another user of the communication platform, a message being posted to one or more forums or pages associated with the communication platform, an asset transaction associated with one or more users of the communication platform, and the like. In one embodiment, back-end system 306 may store a prior listing of generated one-time passwords and may identify if the received one-time password matches one of the previously generated one-time passwords. If the received one-time password matches one of the previously generated one-time passwords, back-end system 306 may request another one-time password from user device 302. Such an embodiment may take into account transmission latencies between user device 302 and back-end system 306. For example, user device 302 may generate a first temporary password at first time, but it may be not be received by back-end system 306 until a second time. However, at this second time, back-end system 306 may have already generated a second temporary password. Such a mismatch may not positively indicate that user device 302 and back-end system 306 have different authentication tokens, but instead may indicate network latency between user device 302 and back-end system 306. In order to combat network latency, back-end system 306 may store, for example, the previously generated three one-time passwords (wherein a new password is generated, for example, every minute) and determine if a received one-time password matches one of those previously generated three one-time passwords. If there is a match, then in one embodiment, back-end system 306 may request user device 302 to transmit another one-time password to confirm that that one-time password is accurate. In one embodiment, back-end system 306 may not request user device 302 for an additional one-time password, but instead back-end system 306 may simply authenticate the one-time password. The latter embodiment may save network and computational resources by not requiring additional tokens to be generated and transmitted to back-end system 306.

For each subsequent new communication processes associated with 320-324, processes may be repeated such that each subsequent new communication may require a one-time password. By requesting a one-time password for each new communication, back-up system 306 may increase security of the communication platform. In one embodiment, one-time passwords may only be required for certain type of communications. For example, one-time passwords may only be required for new communications that involve an asset transaction, new communications that involve multiple recipients, non-white listed recipients and the like. In such an example, one-time passwords may be not required for communications to white listed recipients, an asset transaction below a certain threshold hold, a communication to a single user and the like.

Figure 4:
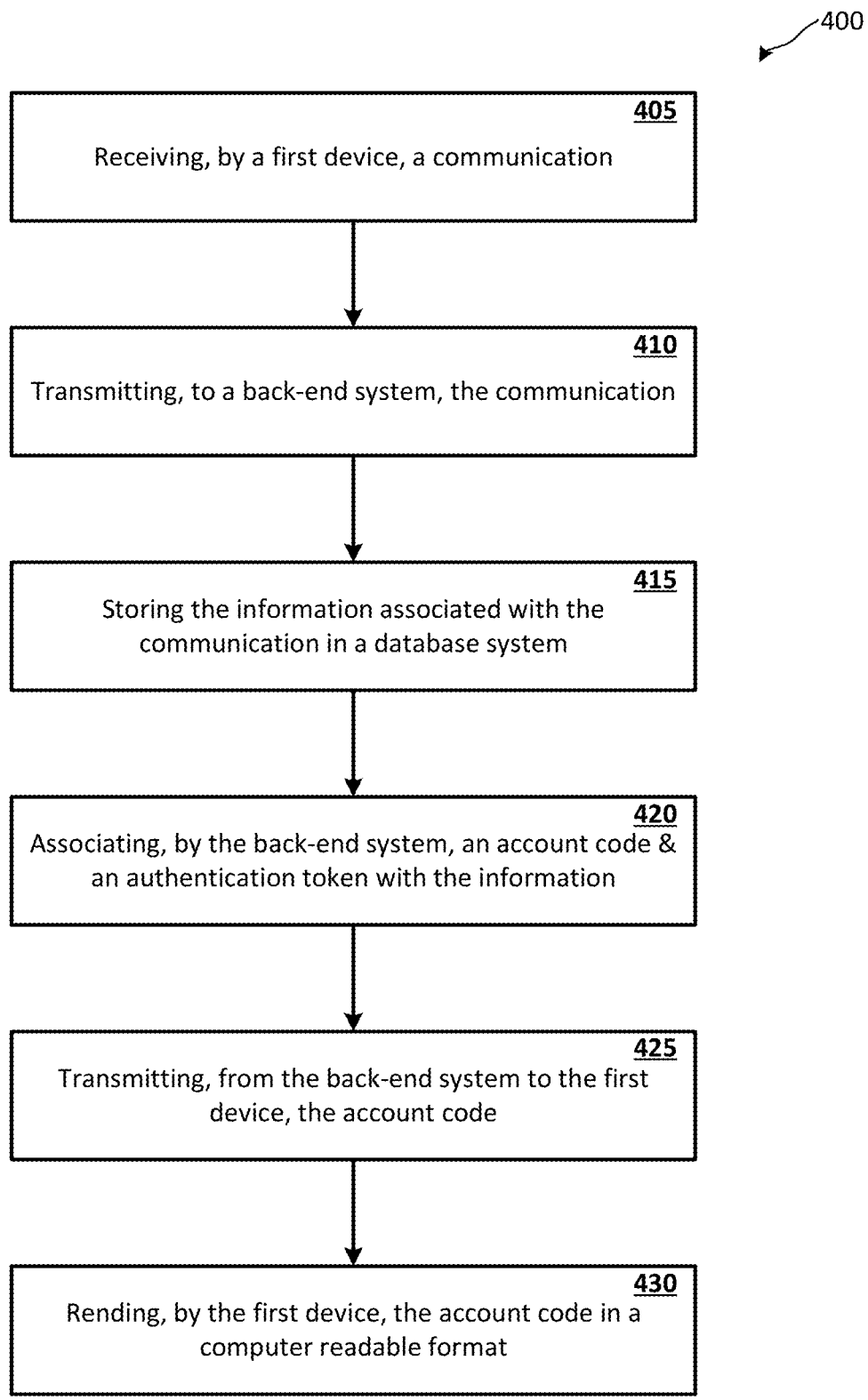
FIG. 4 illustrates a first exemplary process in accordance with one or more embodiments.

FIG. 4 illustrates process 400 for receiving and rendering an account code by a first device. In one embodiment, the first device may be a device physically situated at a location associated with a communication platform. For example, a first device may be a computing device situated at a retail location associated with the communication platform. At 405, the first device may receive a communication. The communication may be received via a wireless communication means such as NFC or Bluetooth from a mobile device. In one embodiment, parts of a communication may be received from a mobile device and other parts may be generated by the first device. For example, a sender's name and address may be received by the first device from a mobile device, but the recipient's name and address may be generated by the first device. In one embodiment, the recipient's name and address may be retrieved from a database associated with the first device. In such an embodiment, the database may comprise of users of the communication platform.

At 410, the first device may transmit the communication to a back-end system. The communication may be transmitted by various means such as the Internet, a WAN, a LAN, and the like. In one embodiment the back-end system may be a collection of servers, such as application servers, webservers, and the like that are associated with operating the communication platform.

At 415, the back-end system stores information associated with the communication in a database system. Information associated with the communication may include various pieces of personal information associated with the sender and receiver of the communication. Such personal information may include a sender's name, a sender's address, a sender's telephone number, a receiver's name, a receiver's address, a receiver's telephone number, and the like. Such information may be referred to as account information associated with a user that is associated with the communication. In one embodiment, the user that is associated with the communication may be the sender of the communication.

At 420, the back-end system associates an account code and an authentication token with the information associated with the communication. The back-end system may generate and associate an account code and an authentication token with account information associated with a user. The back-end system may generate a unique identifier, such as an alphanumeric identifier for the account information. This unique identifier may uniquely identify account information associated with a particular user. In one embodiment, the unique identifier may be the account code. In one embodiment, the account code may be generated based on the account identifier. For example, an account code may be embodied as a QR code representation of the unique identifier (i.e. account identifier). The back-end system may generate an authentication token based on one or more parts of the account information. For example, the back-end system may generate a hash of a sender's address, a phone number associated with a user (such as a secondary phone number), and the like. The hash may be utilized as a seed in a random number generator that may periodically generate a temporary one-time password. The seed value and the identifier of an algorithm may together be referred to as the authentication token. In instances where a secondary phone number is utilized to generate a seed value, a primary phone number may be a phone number associated with a user device which generated or helped generate the communication. The secondary phone number may be another phone number associated with the user, such as a work number, a landline number, or the like. Such an embodiment may add security to the communication platform in situations in which a third party intercepts the communication indicating the user device's phone number. In that particular embodiment, a third-party may be able to replicate the seed value relatively easily.

The back-up system may receive the additional phone number directly from the first device. In one embodiment, the first device and the back-up server may have a more secure connection than a user device and the back-up server because the first device and the back-up server may be owned and operated by a single entity, such as the entity that operates the communication platform. Thus, one or more key pieces of account information may only be transmitted via the secure connection (e.g., encrypted, virtual private network (VPN), etc.) between the first device and the back-up server. Such pieces of account information may include social security number of a user, additional telephone numbers associated with the user, linked bank accounts associated with the user, security questions, and the like. These pieces of information may be, in one embodiment, exclusively used to generate the seed value.

At 425, the back-end system transmits the account code to the first device and at 430, the first device renders the account code in a computer-readable format. The first device may render the account code in the form of a QR code. In such an embodiment, the first device may render the account code on a printed piece of a paper (e.g., a receipt) via a printing device. In one embodiment, the first device may render the account code on a display associated with the device. In one embodiment, the first device may only render the account code in response to the transmitted communication (at 405) being a communication involving an asset transaction.

Figure 5:
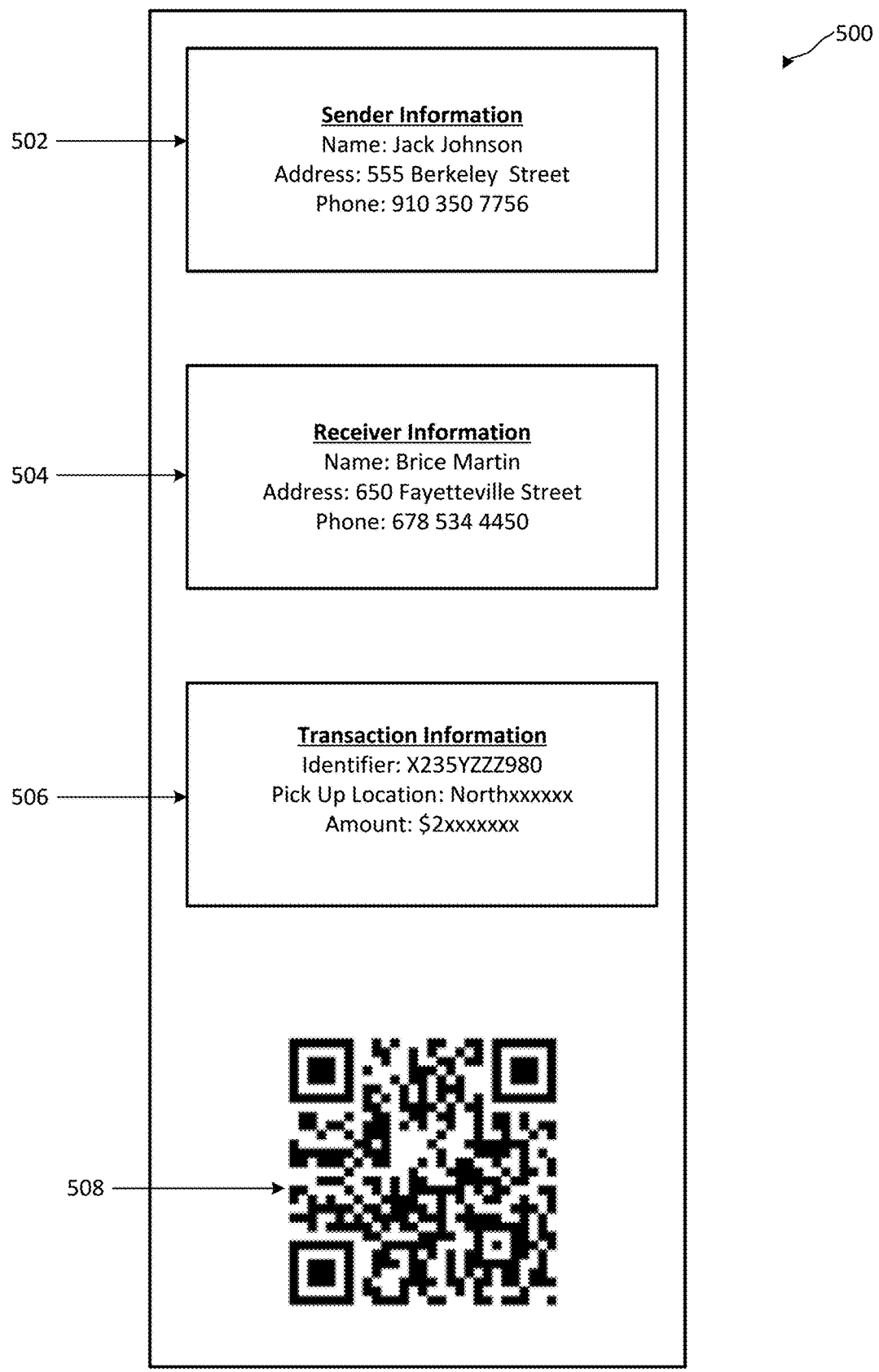
FIG. 5 illustrates an exemplary tangible property in accordance with one or more embodiments.

FIG. 5 illustrates tangible property 500, which may be produced by a device according to one or more embodiments. Tangible property 500 may be a printed receipt, a business card, or the like. Tangible property 500 may be created at 430 in process 400. In one embodiment tangible property 500 may be embodied by paper, or similar material. In one embodiment, tangible property 500 may be embodied in digital form, such as a digital receipt. Tangible property 500 may comprise sender information 502, receiver information 504, transaction information 506, and computer-readable code 508. Sender information 502 may include information associated with the sender of a communication. For example, sender information may include name, address, and phone number. Receiver information 504 may include information associated with the receiver of a communication. For example, receiver information may include name, address, and phone number. Transaction information 506 may include information associated with the communication. For example, transaction information may include a transaction identifier that uniquely identifies a transaction associated with a communication, a pick-up location that uniquely identifies a pick-up location, and an amount that indicates an amount transferred in accordance with a communication. The pick-up location may indicate a location for a receiver to retrieve funds transferred. For example, the pick-up location may be a retail location at which the receiver may pick up the amount of funds transferred. At the retail location the receiver may receive funds associated with the communication in the form of a digital transfer or a preloaded device such as a smart card.

In one embodiment, one or more parts of transaction information 506 may be redacted such that if tangible property 500 ever unintentionally fell into the hands of a third-party so that the third-party would not be able to know potentially critical details of the communication. In one or more embodiments described herein, transaction information 506 may be utilized to create a seed value for a one-time password. If a third-party were to come into possession of transaction information 506 that third-party may be able to generate a valid seed value to generate a valid one-time password and impersonate the sender of the communication.

Computer-readable code 508 may be a code that is capable of being read by a user device (e.g., a mobile phone) to retrieve an account identifier. The account identifier may correspond to a unique account associated with a communication platform. Computer-readable code 508 may be read by a user device and the user device may subsequently transmit an account identifier to a back-end system associated with the communication platform to initiate a process to activate an authentication token.

Figure 6:
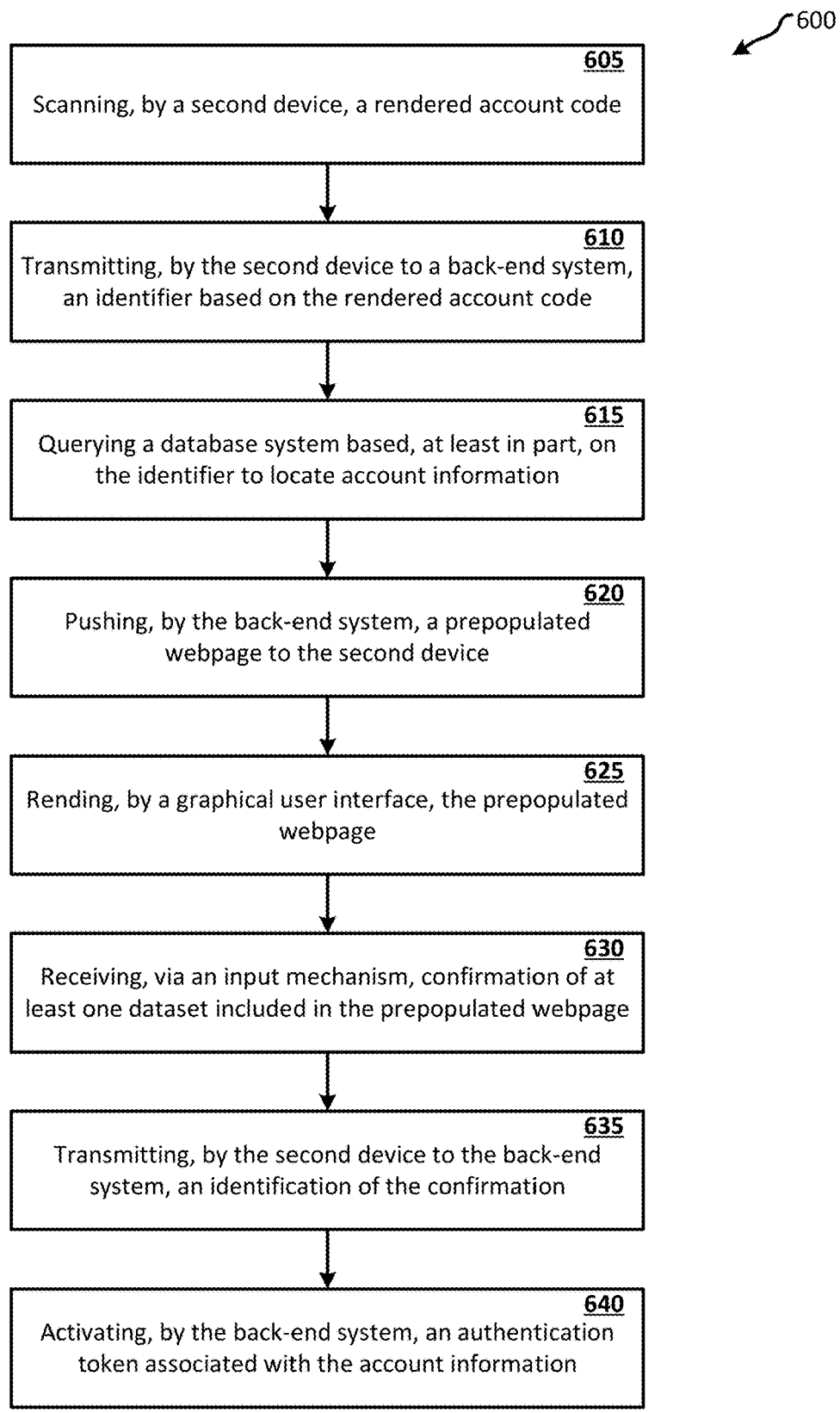
FIG. 6 illustrates a second exemplary process in accordance with one or more embodiments.

FIG. 6 illustrates process 600 for activating an authentication associated with an account within a communication platform. At 605, a second device may scan a rendered account code to generate a unique identifier. An account code may be rendered as illustrated in FIG. 5. The second device may be a device associated with a user of the communication platform. For example, the second device may be a mobile phone, laptop, tablet and the like. The second device may scan the rendered account code utilizing a camera associated with the second device. In one embodiment, the rendered account code may be embodied as a QR or bar code. In such an embodiment, the second device may scan the rendered account code with an associated camera. The scanned rendered account code may yield a unique identifier that corresponds with account information on a back-end system. The back-end system being a system that operates one or more features of the communication platform.

At 610, the second device may transmit, to a back-end system, an identifier based on the rendered account code. The identifier may be acquired by scanning the rendered account code at 605. The second device may transmit the identifier to the back-end system. The second device may transmit the identifier via a public connection such as the Internet.

At 615, the back-end system may query a database system based, at least in part on, the identifier in order to locate account information. The database system may comprise stored information associated with communications within the communication platform. One such communication may be associated with the rendered account code at 605. As a result, when the back-up system queries the database system based on a unique identifier associated with the rendered account code, an entry may be located that comprises account information associated with that unique identifier.

At 620, the back-end system may prepopulate a webpage based at least in part on account information associated with a user of the second device and push the prepopulated webpage to the second device. The webpage may be for activating an authentication token or an account associated with the user of the second device. The back-end system may prepopulate one or more data fields within the webpage and transmit the prepopulated webpage to the second device as, for example, an URL.

At 625, the second device may render, via a graphical user interface, the prepopulated webpage. An example of a prepopulated webpage 700 is shown in FIG. 7. Prepopulated webpage may have a plurality of data fields such as "first name", "middle name", "last name", "address", "phone", and "D.O.B." (date of birth). One or more data fields may be prepopulated with a dataset by the back-end system according to retrieved account information. As shown in FIG. 7 data fields "first name", "last name", "address", and "phone number" are prepopulated with corresponding datasets when received by the second device. However, data fields "middle name" and "D.O.B." are not prepopulated by the back-end system. In such an instance, the back-end system may not have account information that corresponds to the "middle name" or "D.O.B." data fields.

Now with returned reference to FIG. 6, at 630, the second device may receive, via an input mechanism, confirmation of at least one dataset included in the prepopulated webpage. Once the prepopulated webpage has been rendered, the second device may receive inputs that indicate if the displayed datasets are confirmed or modified. For example, if a data field entitled "first name" has a prepopulated dataset of "Jack", then the second device may receive an input indicating if that dataset is confirmed or if the dataset is changed. In one embodiment, if a dataset is modified it may be then confirmed such that all required datasets within the prepopulated webpage are confirmed either without modification or after modification.

At 635, the second device may transmit to the back-end system an identification of the confirmation of datasets within the prepopulated webpage. The confirmation may indicate datasets associated with each required data field within the prepopulated webpage. The confirmation may be send over a public network.

At 640, the back-end system may activate an authentication token associated with the account information. Upon receiving the confirmation, the back-end system may update (if necessary) account information associated with the user of the second device. The back-end system may then activate a previously associated authentication token such that the authentication token initializes the generation of one or more one-time passwords. In addition, the back-end system may transmit to the second device an indication of how to produce corresponding one-time passwords, such that the second device and the back-end system may produce the same one-time passwords.

In response to the activation of the authentication token, interface 800 as indicated in FIG. 8 may be rendered on the second device. Interface 800 may indicate that an account has been successfully activated. A successful account activation may also initialize an authentication token for that account such that a user may be authenticated via a temporary password when transmitting or receiving communications associated with the account within the communication platform. In one embodiment, interface 800 may indicate one or more missing required data fields in instances where the back-up system has not received one or more datasets associated with one or more required data fields. For example, upon receiving confirmation of at least one dataset included in the prepopulated webpage, there may be one or more required data fields within the prepopulated webpage that are missing. For example, a "first name" data field may be missing or not contain the required characters (e.g., "first name" field needs to be at least 5 characters). In this instance, an account may not be activated without this required information and thus an error may be returned to the second device and as a result of the error interface 800 may display a description of the error.

Figure 9:
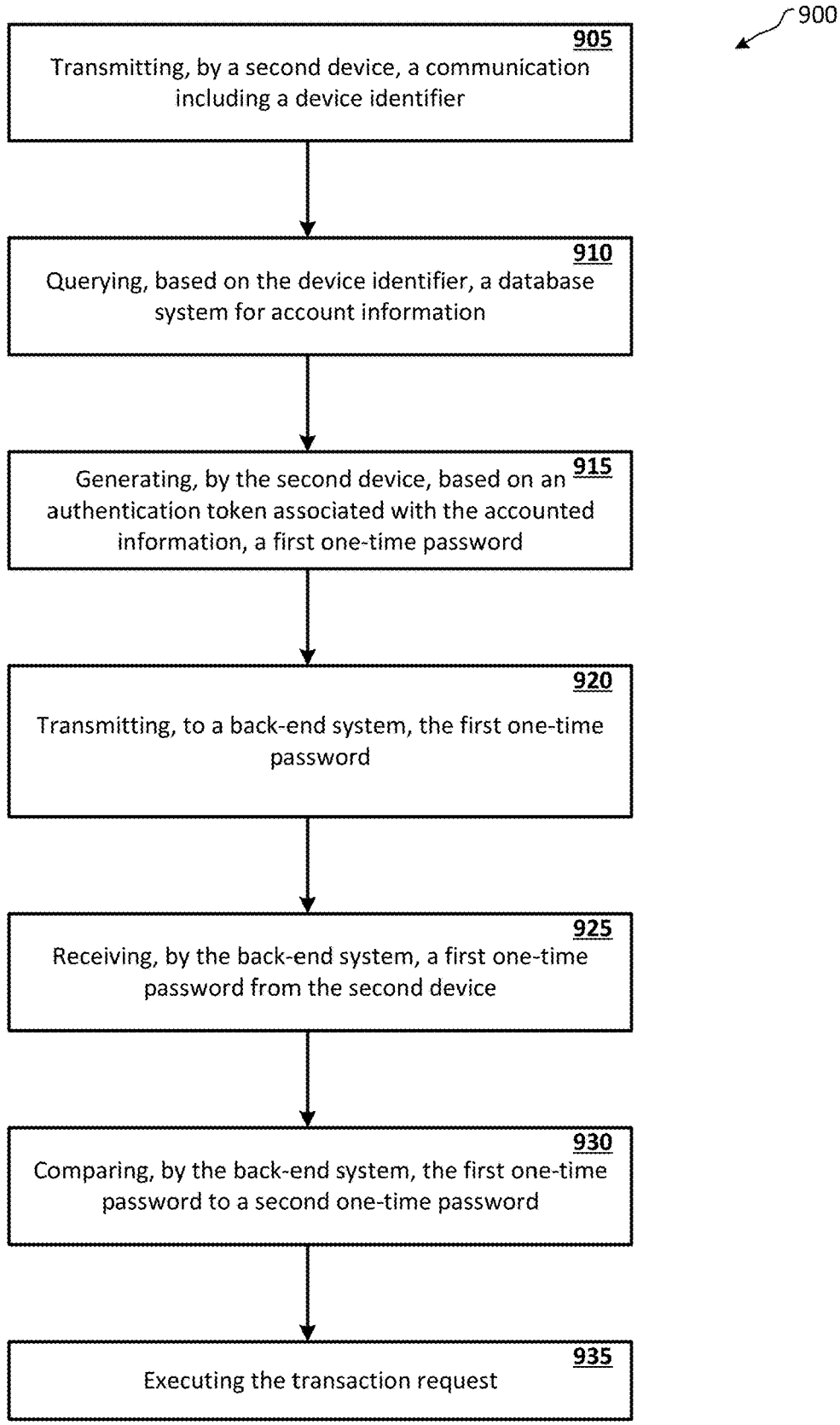
FIG. 9 illustrates a third exemplary process in accordance with one or more embodiments.

FIG. 9 illustrates process 900 for authorizing and executing a communication within a communication platform. At 905, a second device sends a communication including a device identifier. The second device may be a device associated with a user of the communication platform. For example, the second device may be a mobile phone, laptop, tablet and the like. The user may have a previously activated account and/or authentication token associated with the communication platform. A device identifier may be a mobile number or hardware identifier (e.g., IMEI) associated with the second device. The device identifier may be stored in account information associated with the second device. The communication may be for a request of a variety of actions associated with the communication platform, such as posting a text message to a public profile, messaging another user associated with the communication platform, sending electronic funds to another user associated with the communication platform, and the like.

At 910, the back-end system may query, based on the received device identifier, a database system for account information associated with the device identifier. The account information may include various data associated with the second device and/or the user of the second device. An example of account information may be found in FIG. 2 and related descriptions. The back-end system may transmit an indication to the second device that it has found account information associated with the second device.

At 915, the second device generates, based on an authentication token, a first one-time password. Upon an account being activated the second device may receive information to generate a one-time password. For example, the back-end system may send a message to the second device indicating a seed value and an algorithm that may be utilized to generate a one-time password. Such a message may be "Seed value=Hash algorithm 1 (first name)+Hash algorithm 2 (last name), Algorithm=RN2". This message may indicate to the second device how to calculate a one-time password. The message for calculating a one-time password may be sent subsequent to an account being activated or an authentication token being activated. In one embodiment, the data utilized to generate by one-time password may be dynamically received by the second device instead of being stored on the second device. For example, if a seed value is calculated based on a second phone number associated with an account, then the second phone number may be dynamically received by the second device via user input instead of by querying memory associated with the second device. Once the second device receives data to calculate the one-time password the one-time password may be generated. By utilizing dynamic information instead of stored information a one-time password may not be simply generated if a second device is stolen. Instead a user must not only possess the second device, but also have knowledge of a set of non-stored information. Non-stored information may include, for example, additional phone numbers associated with a user, a user's pet names, a user's social security number, a user's previous employer, a prior address (physical or virtual), a prior purchase made by a user, an identification of a prior item purchased by a user, and the like. In one embodiment non-stored information may be stored within the back-end system, but not on the second device.

At 920, the second device may transmits the first one-time password to the back-end system. The transmission may be conducted via a public connection such as the Internet. At 925, the back-end system receives the first one-time password from the second device. In one embodiment, a timestamp may be recorded when the first one-time password is received.

At 930, the back-end system compares the first one-time password to a second one-time password to authorize execution of the received communication. The second one-time password may be generated by an authentication token residing within the back-end system, the authentication token being associated with the second device. If the second device and the back-end system utilize the same metrics (e.g., seed value and algorithm) to produce the first one-time password and the second one-time password, respectively, then both passwords would match and the communication transmitted at 905 would be partially authorized. The communication may only be partially authorized because there may be additional restrictions for communications stored within account information associated with an account. For example, there may be a white list of recipients for a communication that may need to be analyzed prior to fully authorizing the communication. In one embodiment, the back-end system may periodically generate second one-time passwords and may store a portion of those second one-time passwords (e.g., the last 5 generated). Each of the second one-time passwords may have an associated timestamp that indicates a time when the second one-time password was generated. In one embodiment, the first one-time password and a receipt timestamp may be compared to a plurality of second one-time passwords to determine if the first one-time password matches a previously generated second one-time password. For example, a first one-time password may have a first value and a corresponding first time stamp. This first one-time password may not match the current second one-time password that is generated by the back-up system. This may be due to network lag or some other issue. Instead of requesting a new first one-time password from the second device, the back-end system may compare the first value and the first timestamp to second one-time passwords and corresponding time stamps to determine if a first one-time password matches a previous second one-time password. If there is a match then the first one-time password may be partially authorized without requiring the second device to generate an additional first one-time password, which may save computational and network resources.

At 935, once the communication has been fully authorized (e.g., confirming first one-time password and restrictions associated with an account), the back-end system may execute the communication received at 905. In one embodiment, the back-end system may execute the communication by transmitting contents of the communication to an indicated recipient. In one embodiment, the back-end system may cause funds from a first account to be transferred to a second account according to contents of the communication. In such an embodiment, the first and second accounts may be associated with the communication platform, or may be accounts external of the communication platform (e.g., a bank account, prepaid smart card, and the like).

Figure 10:
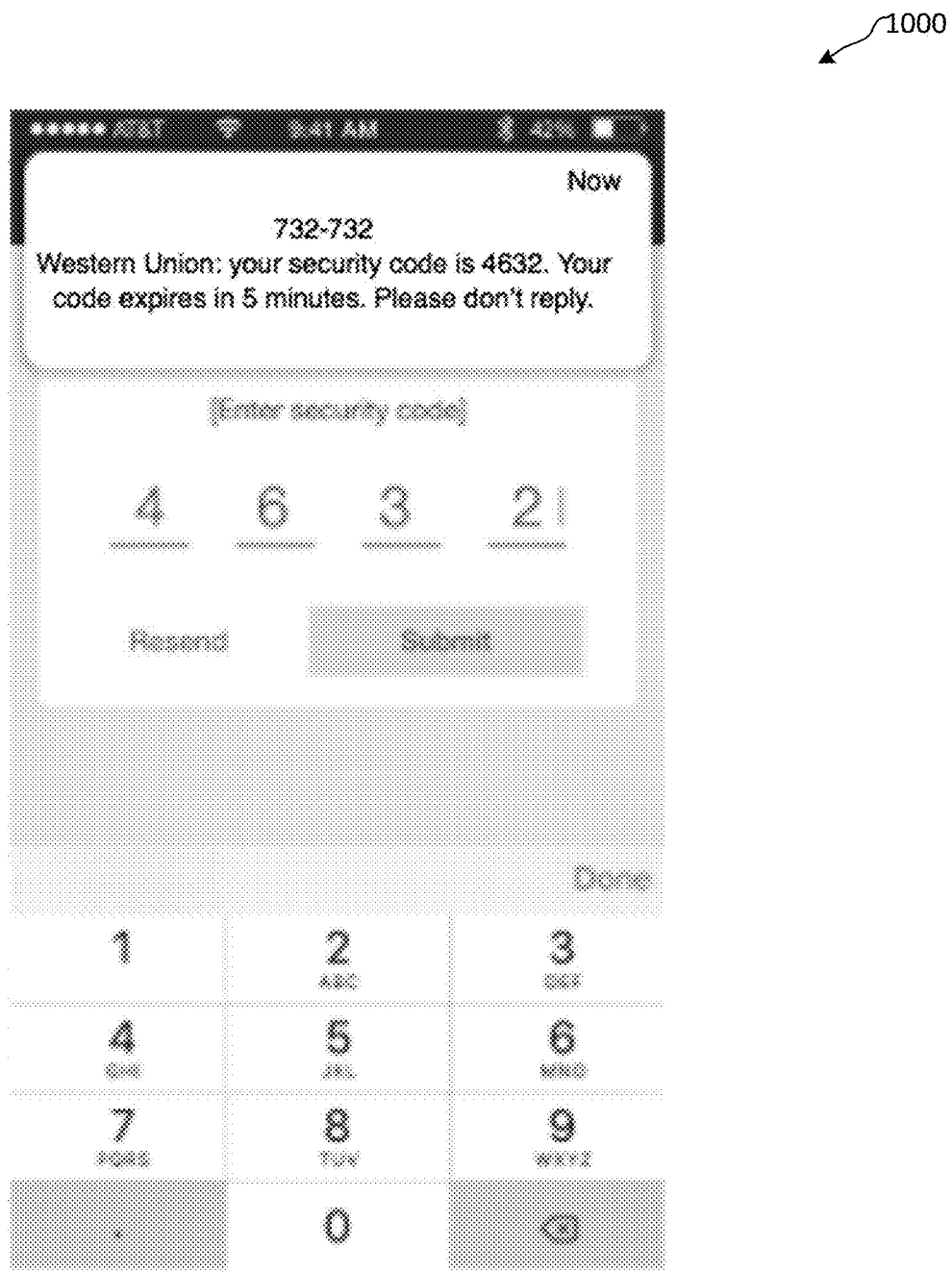
FIG. 10 illustrates a second exemplary interface in accordance with one or more embodiments.

Although process 900 has been described as having the second device generate a first one-time password and the back-end system generate a second one-time password separately, in another embodiment, the back-end system may transmit a security code to the second device and the second device may send back the security code. Interface 1000 as shown in FIG. 10 illustrates an example of such an embodiment. Interface 1000 may be presented to a second device after transmitting a communication to the back-end system. Once the back-end system receives the communication it may send the second device a temporary passcode via a communication means such as email or text message. The second device may then receive the temporary passcode by user input (e.g., via a physical keypad, a digital keypad, touch screen, etc.). The second device may then transmit the received temporary passcode to the back-end system, and the back-end system may verify the temporary passcode. In such an embodiment, processing resources may be saved because one-time passwords may not be constantly generated by the second device and/or the back-end system. In one embodiment, the temporary passcode may be generated by similar means as the one-time password. Such that the temporary passcode may be generated based on account information.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in any order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for authorizing a communication within a communication platform, the computer-implemented method comprising:
   receiving, from a first device, a first communication;
   parsing the first communication to extract a first data set;
   storing the first data set as account information associated with a second device;
   generating, based at least partially on the account information, an account code;
   generating an authentication token that comprises a seed value and an algorithm identifier, at least partially by generating a hash of concatenated parts of the account information, where the hash corresponds to a seed value for an algorithm identified by the algorithm identifier;
   transmitting, to the first device, the account code, wherein the first device is configured to render the account code;
   receiving, from the second device, the account code;
   in response to receiving the account code, activating the authentication token to generate a first one-time passcode using the algorithm identified by the algorithm identifier;
   receiving, from the second device, a second communication and a second one-time passcode;
   comparing the first one-time passcode and the second one-time passcode to authorize the second communication; and
   in response to authorizing the second communication, executing the second communication.

2. The computer-implemented method of claim 1, wherein the first communication is associated with an asset transaction.

3. The computer-implemented method of claim 1, wherein first device is located at a physical location, the physical location being associated with the communication platform.

4. The computer-implemented method of claim 1, wherein the authentication token comprises a seed value and an algorithm identifier.

5. The computer-implemented method of claim 1, wherein the authentication token comprises of a hash one of or more parts of the account information.

6. The computer-implemented method of claim 1, wherein the account code is a QR code or barcode.

7. The computer-implemented method of claim 1, wherein the second communication comprises a text message to a user of the communication platform.

8. A non-transitory, computer-readable storage medium having stored thereon instructions for causing at least one computer system to perform operations comprising:
   receiving, from a first device, a first communication;
   parsing the first communication to extract a first data set;
   storing the first data set as account information associated with a second device;
   generating, based at least partially on the account information, an account code;
   generating an authentication token that comprises a seed value and an algorithm identifier, at least partially by generating a hash of concatenated parts of the account information, where the hash corresponds to a seed value for an algorithm identified by the algorithm identifier;
   transmitting, to the first device, the account code, wherein the first device is configured to render the account code;
   receiving, from the second device, the account code;
   in response to receiving the account code, activating the authentication token to generate a first one-time passcode using the algorithm identified by the algorithm identifier;
   receiving, from the second device, a second communication and a second one-time passcode;
   comparing the first one-time passcode and the second one-time passcode to authorize the second communication; and
   in response to authorizing the second communication, executing the second communication.

9. The non-transitory, computer-readable storage medium of claim 8, wherein the first communication is associated with an asset transaction.

10. The non-transitory, computer-readable storage medium of claim 8, wherein the first device is located at a physical location, the physical location being associated with a communication platform.

11. The non-transitory, computer-readable storage medium of claim 8, wherein the authentication token comprises a seed value and an algorithm identifier.

12. The non-transitory, computer-readable storage medium of claim 8, wherein the authentication token comprises of a hash of one of or more parts of the account information.

13. The non-transitory, computer-readable storage medium of claim 8, wherein the account code is a QR code or barcode.

14. The non-transitory, computer-readable storage medium of claim 8, wherein the second communication comprises a text message to user of a communication platform.

15. A system for authorizing a communication within a communication platform, the system comprising:

one or more processors; and a memory coupled with the one or more processors, the memory configured to store instructions that, when executed by the one or more processors, cause the one or more processors to:

receive, from a first device, a first communication;

parse the first communication to extract a first data set;

store the first data set as account information associated with a second device;

generate, based at least partially on the account information, an account code;

generate an authentication token that comprises a seed value and an algorithm identifier, at least partially by generating a hash of concatenated parts of the account information, where the hash corresponds to a seed value for an algorithm identified by the algorithm identifier;

transmit, to the first device, the account code, wherein the first device is configured to render the account code;

receive, from the second device, the account code;

in response to receiving the account code, activate the authentication token to generate a first one-time passcode using the algorithm identified by the algorithm identifier;

receive, from the second device, a second communication and a second one-time passcode;

compare the first one-time passcode and the second one-time passcode to authorize the second communication; and in response to authorizing the second communication, execute the second communication.

16. The system of claim 15, wherein the first communication is associated with an asset transaction.

17. The system of claim 15, wherein the first device is located at a physical location, the physical location being associated with the communication platform.

18. The system of claim 15, wherein the authentication token comprises a seed value and an algorithm identifier.

19. The system of claim 15, wherein the authentication token comprises of a hash of one of or more parts of the account information.

20. The system of claim 15, wherein the account code is a QR code or barcode.

* * * * *